Dec. 13, 1927.

C. F. RANDOLPH 1,652,412

TAILSTOCK

Filed Feb. 18, 1926     3 Sheets-Sheet 1

INVENTOR
C. F. Randolph
BY
Joseph N. Schofield
ATTORNEY

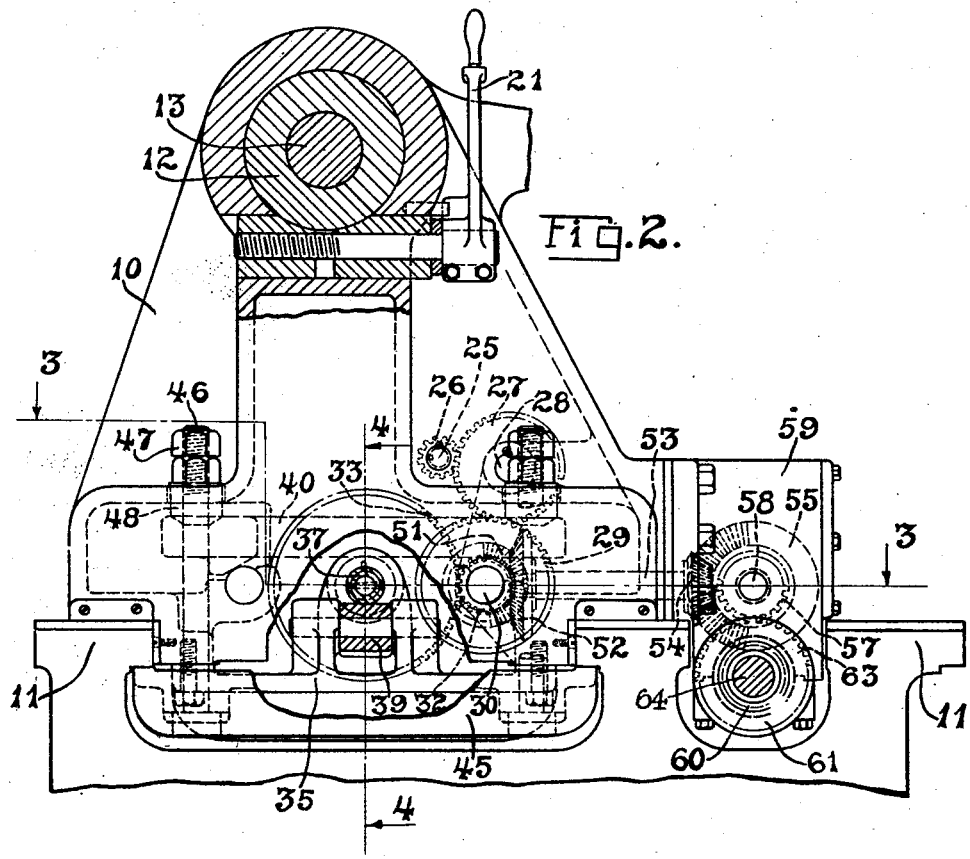

Dec. 13, 1927.
C. F. RANDOLPH
1,652,412
TAILSTOCK
Filed Feb. 18, 1926        3 Sheets-Sheet 3
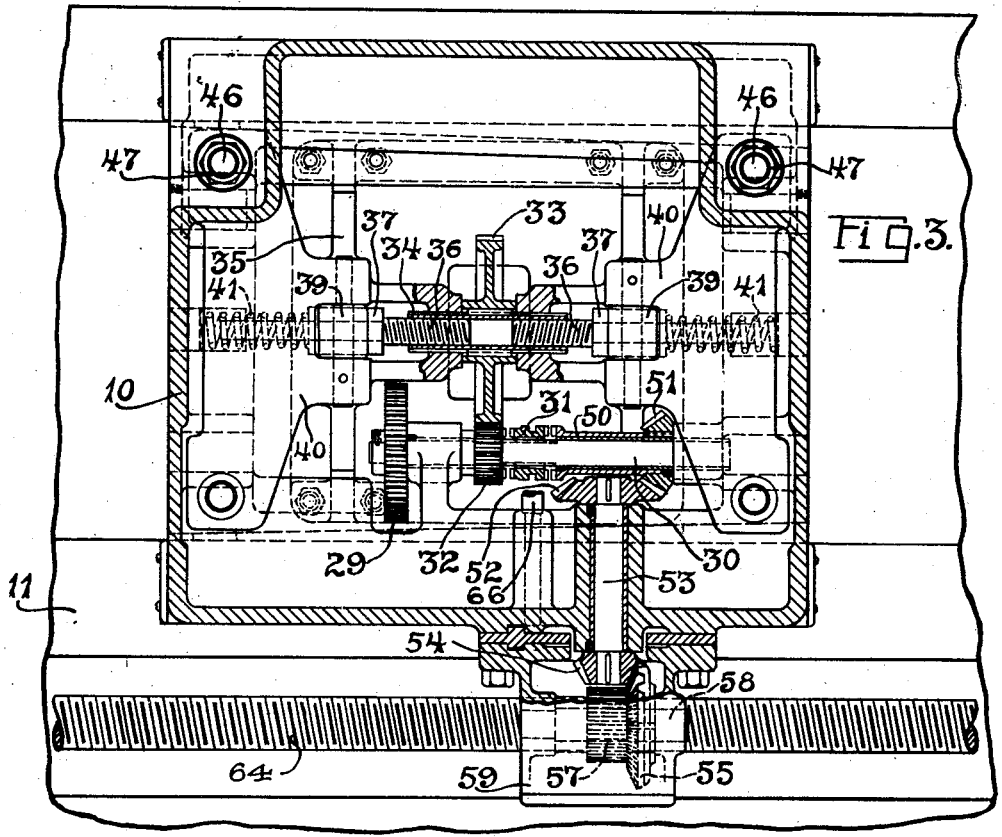
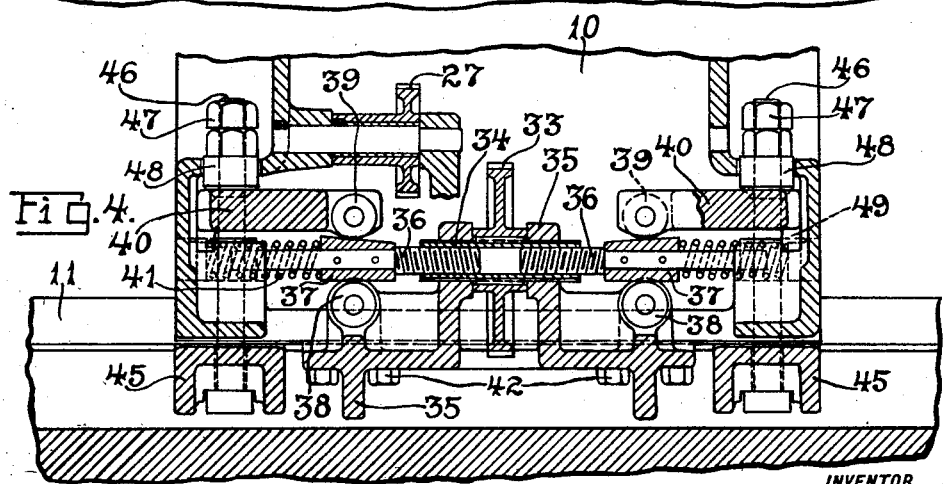
INVENTOR
C.F. Randolph
BY
Joseph F. Schofield
ATTORNEY Patented Dec. 13, 1927.

1,652,412

UNITED STATES PATENT OFFICE.

CLIFFORD F. RANDOLPH, OF PLAINFIELD, NEW JERSEY, ASSIGNOR TO NILES-BEMENT-POND COMPANY, OF NEW YORK, N. Y., A CORPORATION OF NEW JERSEY.

TAILSTOCK.

Application filed February 18, 1926. Serial No. 89,105.

This invention relates to lathes and in particular to a tailstock adapted for heavy duty lathes of large size.

An object of the present invention is to provide a clamping means for a lathe tailstock adapted to be operated by an electric motor to rigidly secure the tailstock in adjusted position to the lathe ways.

Another object of the invention is to provide a traversing mechanism for the tailstock adapted to be operated by an electric motor to rapidly move the lathe tailstock in either direction along the lathe ways.

Another object of the invention is to provide an electric motor directly mounted upon a lathe tailstock and adapted to operate the traversing and clamping mechanisms therefor, clutch means being provided to optionally engage said mechanisms and to prevent simultaneous engagement of said mechanisms.

With these and other objects in view, my invention consists in the features of construction and operation set forth in the following specification and illustrated in the accompaying drawings.

In the accompanying drawings annexed hereto and forming a part of this specification, I have shown my invention embodied in a special form of tailstock, but it will be understood that the invention can be otherwise embodied and that the drawings are not to be construed as defining or limiting the scope of the invention, the claims appended to this specification being relied upon for that purpose.

In the drawings:

Fig. 2 is an end elevation taken on line 2—2 of Fig. 1, a part being broken away to more clearly show elements of the tailstock clamping mechanism.

Fig. 3 is a horizontal sectional view of the tailstock clamping mechanism taken on line 3—3 of Fig. 2, and Fig. 4 is a vertical sectional view taken on line 4—4 of Fig. 2.

Figure 1:
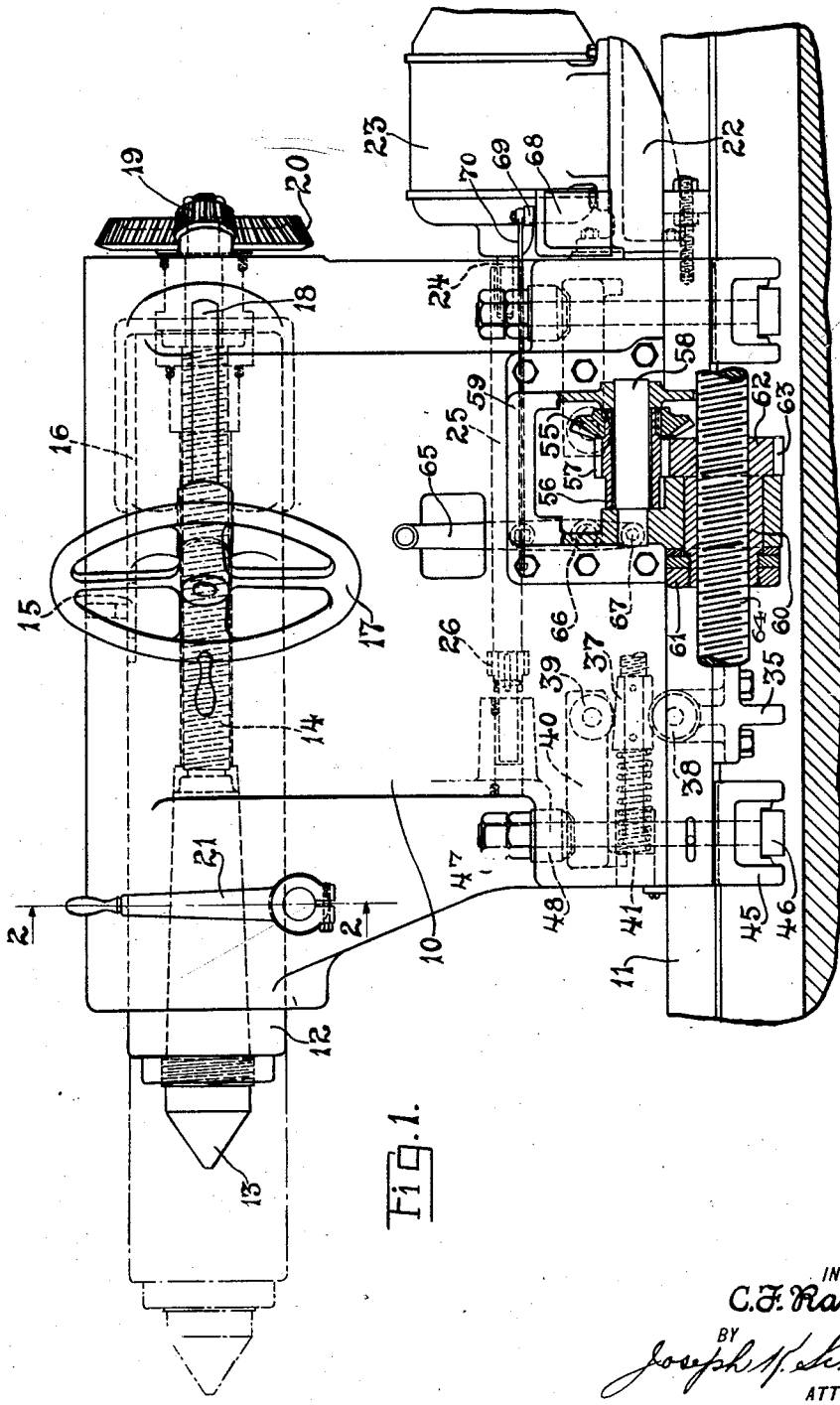
Figure 1 is a longitudinal view of a lathe tailstock, parts being broken away to more clearly show details of construction.

In the above mentioned drawings I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: first, a tailstock having a body member provided with a longitudinally movable spindle; second, means for moving said spindle relative to the tailstock; third, a pair of clamping strips extending transversely of the tailstock and beneath the ways of the lathe on which the tailstock is mounted; fourth, adjustable bolts supporting said clamping strips; fifth, clamping levers fulcrumed on surfaces within the tailstock and attached to said bolts; sixth, wedges movable in opposite directions within the tailstock to simultaneously clamp and unclamp said levers; seventh, a feed screw extending along the lathe bed adjacent the tailstock; eighth, a nut rotatably mounted upon the tailstock and engaging said screw; ninth, a motor mounted upon and movable with the tailstock; tenth, driving connections between the motor and the traversing and the clamping mechanisms; and eleventh, a clutch for selectively or optionally throwing into operation either the clamping or the traversing mechanisms.

Referring more in detail to the figures of the drawings, I provide a tailstock body member 10 adapted to rest upon and be movable relative to longitudinally extending ways 11 on the bed of a lathe. This tailstock 10, as usual, is provided with a longitudinally extending spindle 12 in which a center 13 is retained at one end. By means of a screw 14 rotatable within the tailstock 10 and engaging the spindle 12, this spindle may be traversed axially of the lathe without being rotated. To prevent rotation of this spindle during its axial movement, a small key 15 is mounted within the tailstock adapted to engage a spline 16 in the spindle 12. In the particular form of tailstock illustrated, which is of large size and heavy duty, the screw 14 is rotated by means of a hand wheel 17 connected by means of a shaft 18 to a bevel pinion 19 in mesh with a corresponding bevel gear 20 on the outer end of the screw 14. By rotating the hand wheel 17 in either direction, the spindle 12 may be moved toward or from the tailstock 10. Also, a lever 21 is provided for clamping this spindle 12 rigidly in any adjusted axial position. As this construction is similar to those usually employed, it is not thought that further description is necessary.

On the rear vertical face of the tailstock body member 10 is secured a small bracket 22 on which is mounted an electric motor 23, the armature shaft 24 of which is connected to a driving shaft 25 mounted within the body member 10 and having a small pinion 26 near its opposite end. In mesh with this pinion is an idler gear 27 rotatably mounted on a stud 28 fixed within the body member 10. This gear 27 meshes with a driving gear 29 on a shaft 30 extending axially and centrally of the tailstock 10. This shaft 30 is most clearly shown in Fig. 3 and is provided with a clutch member 31 splined thereto and having clutch teeth on its opposite faces. Adjacent one side of this clutch member 31 is a pinion 32 rotatably mounted on the shaft 30 and provided with clutch teeth on one face. This pinion 32 is in engagement with a gear 33 on a rotatable sleeve 34. It will be seen from this construction that by moving the clutch member 31 into engagement with the teeth provided on the face of the pinion 32 that the sleeve 34 may be rotated, the direction of rotation depending upon the direction of rotation of the electric motor 23.

The sleeve 34 on which this driving gear 33 is mounted is rotatable within suitable bearings within a member 35 secured to the lower surface of the body member 10, and is provided with internal screw threads, one being left-hand and the other right-hand. These screw threads are engaged with corresponding screw threads on oppositely extending bars 36 shown in Fig. 4 so that rotation of the sleeve 34 will force the bars 36 toward or from each other. On these bars or rods 36 are fastened wedges 37, shown clearly in Fig. 4. Preferably and as shown, the lower surfaces of these wedges 37 extend parallelly with the direction of movement of the rods and are engaged by rollers 38 suitably mounted within the member 35 to reduce friction. The upper surfaces of these wedges 37 are disposed obliquely and in opposed relationship to each other, as shown clearly in Fig. 4. These wedge surfaces are engaged by rollers 39 mounted on clamping levers 40, oscillatory movement of which effects clamping and unclamping operations of the tailstock 10.

Pressing against the outer faces of the wedges 37 are springs 41 normally forcing the wedges 37 toward each other, and the sleeve 34 axially through the gear 33 so that the wedges 37 will force the clamping levers 40 upwardly with equal pressures against the rollers 39. As shown clearly in Figs. 3 and 4, the bearings for the sleeve 34 and also for the lower rollers 38 are in the separate member 35 securely fastened by means of screws 42 to the lower surface of the body member 10.

In order that the clamping levers 40 may clamp the tailstock 10 securely to the ways 11, transversely extending clamping strips 45 are mounted below the tailstock 10 and formed to engage the under side of the ways 11 of the lathe bed. These strips 45 are supported in position upon the tailstock 10 by means of bolts 46, two bolts being used for each of the strips 45. Nuts 47 on the bolts 46 provide means for varying the effective length thereof and a washer 48 below the nuts 47 is preferably provided on each bolt 46 for engagement with the clamping levers 40, its lower surface being spherical. Just below this washer 48 is positioned the clamping levers 40 above described, having depressions formed therein for the spherical surfaces of the washers 48 and having their outer lower extremities 49 adapted to rest upon and be fulcrumed relative to the tailstock 10. By means of the right- and left-hand screws on the rods 36, the wedges 37 may be moved toward or from each other and, while moving toward each other, will raise the inner ends of the clamping levers 40, thus raising the bolts 46 slightly and clamping the strips 45 rigidly to the ways 11 of the lathe. By reason of the sleeve 34 being splined to the driving gear 33 the rods 36, the wedges 37 and the sleeve 34 can move axially. This permits the springs 41 to force the wedges to positions to equalize the clamping effect of the levers 40.

On the opposite side of the clutch member 31 on the driven shaft 30 is a sleeve 50 carrying a bevel pinion 51 at one end which is engaged by a corresponding bevel gear 52 on a forwardly extending shaft 53. Clutch teeth are provided on this sleeve 50 for engagement with those on a face of the clutch member 31. By movement of the clutch member 31 toward the right, as viewed in Fig. 3, rotation of the motor 23 in either direction will correspondingly rotate the bevel pinion 51 and the forwardly extending shaft 53. On the forward end of this latter shaft 53 is a bevel pinion 54 in mesh with a bevel gear 55 on a sleeve 56 carrying a spur gear 57. Preferably this spur gear 57 and bevel gear 55 are mounted upon a fixed stud 58 in a bracket 59 outstanding from the tailstock 10. Below this pinion 57 and stud 58 is a rotatable nut 60 held in position relative to the tailstock bracket 59 by adjustable washers 61 at one end and a flange 62 at its opposite end. This flange 62, as shown in Fig. 1, forms a spur gear 63 which is in mesh with the spur pinion 57. Rotation therefore of this forwardly extending shaft 53 in either direction will rotate this nut 60 and thus traverse the tailstock 10 along the lathe ways 11 in either direction by the engagement of the rotating nut 60 with a fixed screw 64 extending along one of the ways 11.

To move the clutch member 31 to either of its operative positions a lever 65 is provided fulcrumed at 66 and having a member 67 engaging a circumferential groove in the clutch member 31. This lever 65 extends upwardly to form a handle so that the clutch 31 may be manually operated. To start and stop the motor 23 a switch box 68 is provided mounted adjacent the motor bracket 22. The lever 69 of the switch enclosed by this box 68 may be operated by means of the lever 65 by connecting it as shown with a reach arm 70 to an intermediate point of the handle portion.

What I claim is:

1. A tailstock comprising in combination, a body member, an axially movable spindle therein, means for clamping said tailstock to ways on which it is movable including oppositely movable wedges, screw threaded means for effecting simultaneous movement of said wedges, driving means for said rotary means, a rotatable nut on said body member adapted to engage a fixed screw for traversing the tailstock, driving connections therefor, an electric motor mounted on said body member, and means to operate said rotary means for moving said wedges and to rotate said nut by said motor.

2. A tailstock comprising in combination, a body member, an axially movable spindle therein, means for clamping said tailstock to ways on which it is movable including oppositely movable wedges, screw threaded means for effecting movement of said wedges into and out of clamping position, means permitting adjustment of said wedges to equalize the clamping action thereof, driving means for said screw threaded means, a rotatable nut on said body member adapted to engage a fixed screw for traversing the tailstock, driving connections therefor, an electric motor mounted on said body member, and means to operate said rotary means for moving said wedges and to rotate said nut by said motor.

3. A tailstock comprising in combination, a body member, an axially movable spindle therein, means for clamping said tailstock to ways on which it is movable including oppositely movable wedges, rotary means for effecting movement of said wedges into and out of clamping position, driving means for said rotary means, a rotatable nut on said body member adapted to engage a fixed screw for traversing the tailstock, driving connections therefor, an electric motor mounted on said body member, and optionally usable connections in said body member for operating said rotary means for said wedges and to rotate said nut by said motor, whereby said tailstock may be clamped or traversed.

4. A tailstock comprising in combination, a body member, an axially movable spindle therein, means for clamping said tailstock to ways on which it is movable including oppositely movable wedges, screw threaded means for effecting simultaneous movement of said wedges, rotating means for said screw threaded means, a rotatable nut on said body member adapted to engage a fixed screw for traversing the tailstock, driving connections therefor, an electric motor mounted on said body member, a central shaft driven thereby, and a positive clutch on said central shaft optionally usable to operate said rotary means and to rotate said nut.

In testimony whereof, I hereto affix my signature.

CLIFFORD F. RANDOLPH.